Nov. 2, 1965  J. E. ECKERT  3,214,952
ROLLING MILL
Filed Jan. 15, 1963  2 Sheets-Sheet 1
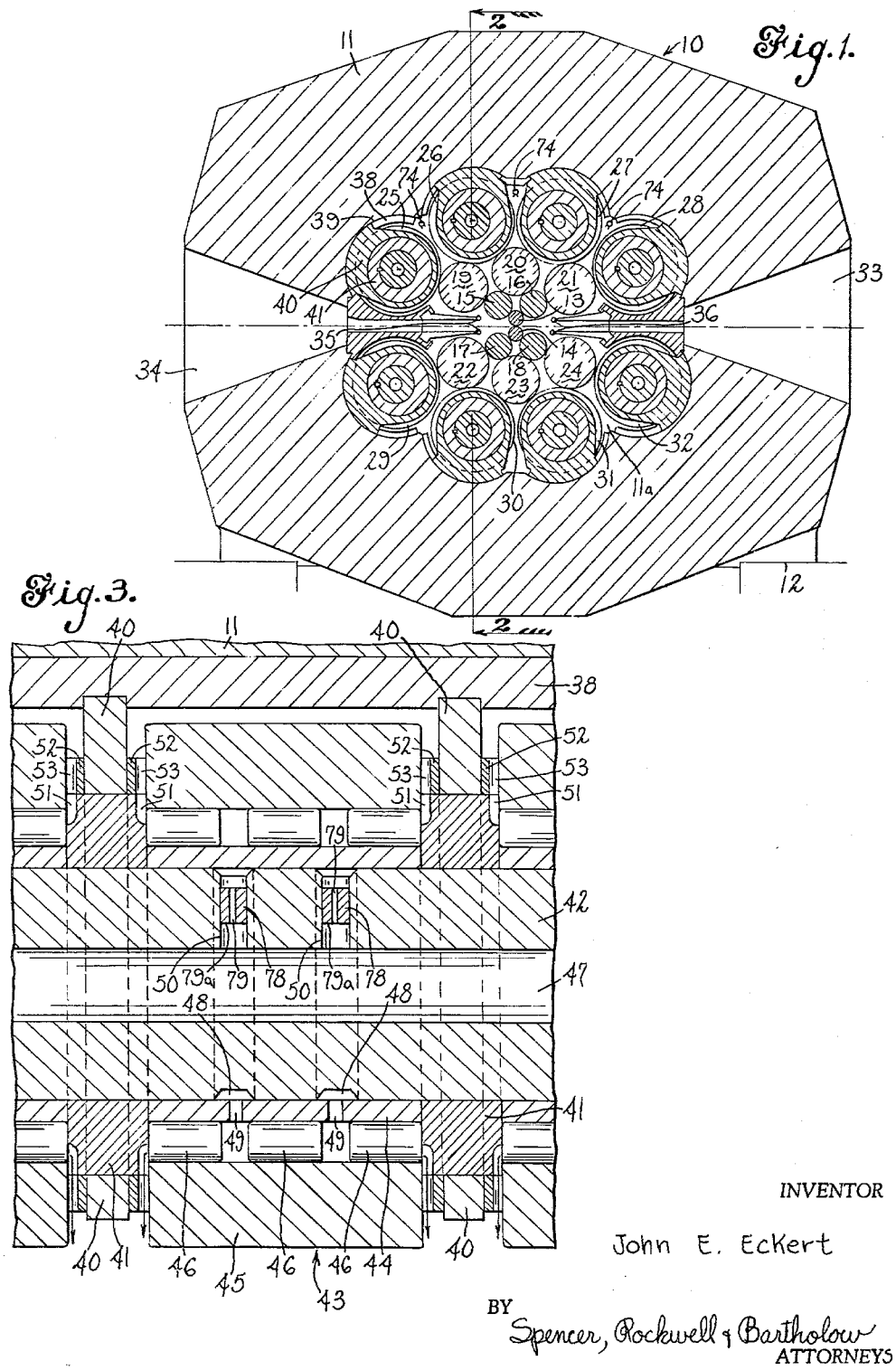
INVENTOR
John E. Eckert
BY Spencer, Rockwell & Bartholow
ATTORNEYS

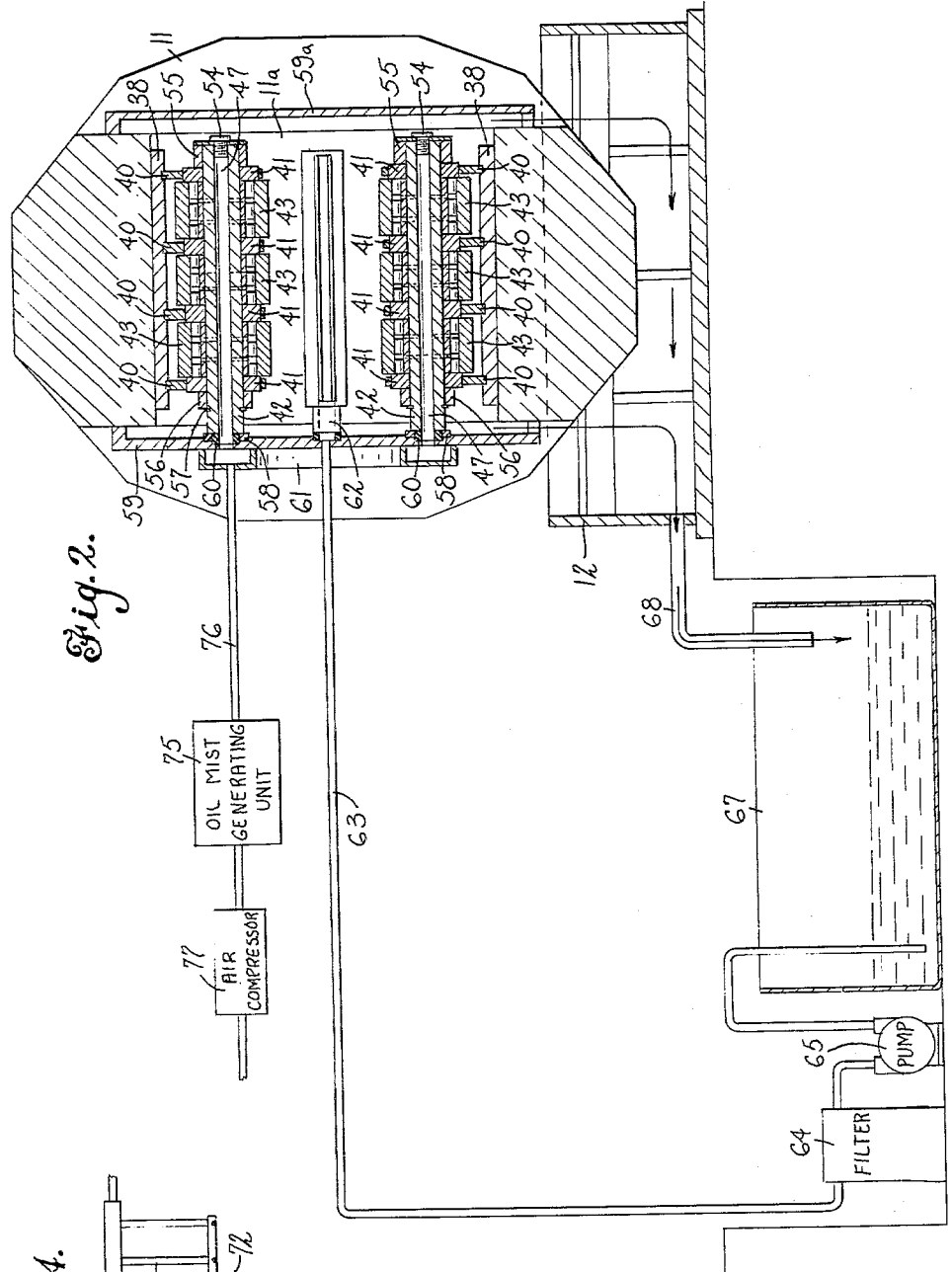

United States Patent Office 3,214,952
Patented Nov. 2, 1965

3,214,952
ROLLING MILL
John E. Eckert, Naugatuck, Conn., assignor to
Textron Inc., Providence, R.I.
Filed Jan. 15, 1963, Ser. No. 251,588
10 Claims. (Cl. 72—201)

This invention relates to rolling mills, and more particularly relates to lubrication and cooling thereof.

The present invention is particularly adapted for use in rolling mills wherein the work rolls are backed up by casters comprising shaft mounted anti-friction roller bearing assemblies and will therefore be disclosed in such an environment. A mill in which the invention may be embodied is disclosed in U.S. Patent 2,776,586, wherein relatively small work rolls are supported by one or more sets of intermediate rolls which in turn are supported by back-up bearings or casters, against a mill housing or beams formed thereby.

These back-up bearings or casters have outer races in contact with the intermediate rolls and therefore rotate therewith. Proper lubrication of the back-up bearings, as is the case with most bearings having rotating outer races, presents a problem. Centrifugal force due to the outer rotating races tends to throw lubricating oil out of the bearings thus requiring that oil be continuously supplied to the bearings.

In some cases, lubricating oil from the back-up bearings is allowed to fall upon the rollers to lubricate the bite of the working rollers and also cool the strip being rolled. However, this presents only a compromise condition inasmuch as a preferred lubricant for the back-up bearings is not entirely satisfactory for satisfying the lubrication requirements of the roll bite, nor does it have the cooling capacity of water or a water-oil emulsion on the strip material being rolled. The back-up bearing lubricant, when used also as a coolant, limits the speed of the mill due to its relatively poor cooling capabilities. Moreover, the use of a relatively rich water-oil emulsion (15–20% oil) for both cooling and bearing lubrication results in relatively poor life of the back-up bearings.

Separate bearing lubricants and strip coolants may be used where the bearings are sealed to prevent the escape of lubricant therefrom. However, this arrangement requires more expensive bearing assemblies and continuous bearing seal maintenance and replacement. The use of grease packing in sealed bearings requires periodic inspection of the bearings, seals and repacking thereof.

In view of the aforementioned difficulties in lubricating the back-up bearings and cooling the rolls, the present invention provides a lubrication system for a rolling mill of the type described wherein an optimum oil may be utilized for lubrication of the back-up bearings and a water or water-oil emulsion used for cooling the strip wherein dilution of the coolant with the bearing lubricant does not affect the cooling properties of the coolant.

The present invention continuously provides continuous metering of lubricant to the back-up bearings in an oil mist or fog and separately recirculates a water or water-oil emulsion for cooling the strip and lubricating the roll bite. Any small amount of lubricating oil not consumed by the bearings is allowed to fall or drip into the confines of the mill and enrich the coolant thereby replacing the lubricant from the coolant consumed in lubricating the roll bite.

Accordingly, it is an object of this invention to provide new and improved lubricating means and strip cooling arrangement for a mill of the type described.

Another object of this invention is to provide a new and improved lubricating system for a mill of the type described wherein an ideal oil may be supplied to the back-up bearing independently of mill cooling and roll bite lubrication considerations.

A further object of this invention is to provide a new and improved rolling mill of the type described wherein the back-up bearing lubricant may be re-used to provide or enrich a water-oil emulsion for strip cooling without affecting the speed of the mill.

A still further object of this invention is to provide a new and improved rolling mill of the type described wherein bearing inspection and maintenance is greatly reduced.

A still further object of this invention is to provide a new and improved rolling mill of the type described wherein the bearings are supplied lubricant in metered amounts which minimizes oil consumption.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings, in which:

FIG. 1 is a view in longitudinal half-section of one type of mill arrangement in which the invnetion may be embodied;

FIG. 2 is a section seen along line 2—2 of FIG. 1, with some rolls of the mill removed, and also illustrating a cooling system used in conjunction with the mill;

FIG. 3 is an enlarged view, a portion of the structure of a caster of FIG. 2; and FIG. 4 illustrates a nozzle arrangement adapted to spray coolant on strip material as it is rolled by the mill.

To illustrate a preferred embodiment of the invention, a mill 10 comprising a housing or frame 11 defining a mill cavity 11a is illustrated. The particular mill illustrated is known as a Sendzimir 1–2–3–4 mill. Housing 11 is supported on a base 12 on a suitable foundation and contains therein a pair of work rolls 13 and 14, sets of first intermediate rolls 15, 16 and 17, 18 contacting work rolls 13 and 14, respectively, and first and second sets of second intermediate rolls 19, 20, 21 and 22, 23, 24 contacting first intermediate rolls 15, 16 and 17, 18, respectively. Intermediate rolls 19, 20 and 21 are backed up by a series of casters 25, 26, 27 and 28. Intermediate rolls 22, 23 and 24 are backed up by casters 29, 30, 31 and 32. The casters 25–32 are comprised of roller bearings and are supported from the frame 11 against the rolling pressure exerted thereon. The various rolls are arranged with their axes parallel. In practice it is preferred that driving torque be applied to the intermediate rolls 19, 21, 22 and 24, by driving means such as a regulated speed electric drive, not shown.

In operation, the strip material to be rolled is introduced into the mill 10 through a window 33, through the work rolls 13 and 14 and exited through another window 34 in the mill frame 11.

The mill further includes sets of coolant sprays or jets 35 and 36 disposed on opposite sides of a strip passed through work rolls 13 and 14 and adapted to spray a coolant on the strip. The cooling spray units 35 and 36 are mounted on suitable mounting brackets 37 and are adapted to be connected to a source of coolant as hereinafter described.

As more clearly shown in FIGS. 2 and 3, each of the casters comprise an arcuate saddle element 38 received in an arcuate seat or beam portion 39 of frame 11. Extending from each of the saddle elements 38 is a plurality of collar elements 40 spaced preferably equidistant along the length of saddle elements 38. Each of the collars 40 receive therein shaft supporting disks 41 which are keyed to shaft 42. Disks 41 are of greater thickness than collars 40. Mounted on shaft 42 between disks 41 and associated collars 40 are a plurality of antifriction bearing assemblies 43. Each of the bearing assemblies 43 comprises an inner race 44 nonrotatably mounted on shaft 42, an outer race 45 and bearing elements 46 therebetween. The outer races 45 of the bearing assemblies 43 rotatively engage and back up the second sets of intermediate rolls 19, 20, 21 and 22, 23, 24, as more clearly seen in FIG. 1.

In accordance with one aspect of the invention, a lubricant conduit 47 is axially defined in shaft 42. Annular recesses 48 are defined in the periphery of shaft 42 and the bearing assemblies are so located on shaft 42 that the space between adjacent rows of bearing elements 46 are aligned with the recesses 48. Inner races 44 have apertures 49 defined therein which provide communication between recesses 48 and the space defined between the inner and outer races 44 and 45, respectively. Passageways or channels 50 are defined in shaft 42 which provide communication between conduit 47 and recesses 48. It may therefore be seen that communication is provided between conduit 47 and the interior of bearing assemblies 43 to allow the introduction of lubricant into the bearing assemblies.

Further, in accordance with the invention, disks 41 are provided with annular recesses 51 on either side thereof adjacent the outer peripheries thereof, which are in open communication with the area between inner and outer races 44 and 45, respectively.

Thrust washers 52, which are provided on either side of collars 40 about disks 41, are provided with radial slots 53 to allow egress of lubricant from the bearing assemblies through recesses 51 and slots 53. Therefore, lubricant which exits from the bearing assemblies 43 will flow onto the intermediate rolls and the working rolls and be mixed with the coolant or, if the mill cavity 11a is flooded with coolant as hereinafter explained, the lubricant may mix with the coolant directly. The conduits 47, defined in shafts 42, are closed at one end thereof by means of a cap 54 (FIG. 2) threadably received within conduit 47. Cap 54 additionally retains a spacer 55 on shaft 42 to take up any thrust exerted on the adjacent disk 41. An annular spacer 56 secured in place with a lock washer 57 is provided on the other end of shaft 42 for similar purposes. One end of shaft 42 abuts a thrust element or block 58 received in a recess provided therefor in the side wall 59 of frame 11. Disposed within thrust element 58 and side wall 59 is a seal 60 to prevent leakage of lubricant as it is introduced into passage 47 from manifold 61.

Coolant which may be water or a water-oil emulsion is directed onto strip passing through the mill by the spray units 35 and 36. The spray units as exemplified by a portion of spray unit 35 (FIG. 4) are connected to a manifold 62 extending through side wall 59 to a conduit 63. Conduit 63 leads to a filter 64 and hence a pump 65 adapted to pump coolant from a coolant reservoir 67 to the spray units 35 and 36. The coolant discharged from the spray units 35, after contacting strip material being rolled, drains to the bottom of frame 11 and hence into base 12 and through drain conduit 68 into coolant reservoir 67, as indicated by the series of arrows (FIG. 2), where it is allowed to cool and then be recirculated to the spray units. It will thus be apparent that the coolant system is a closed circuit, recirculating system, and the mill cavity 11 is closed by side walls 59 and 59a.

A portion of the spray unit 35 is exemplified in FIG. 4 and comprises a manifold 70 having a plurality of tubes 71 extending therefrom into another manifold 72, having a plurality of apertures or jets 73 therein adapted to direct coolant onto strip material as it enters and exits from between the work rolls 13 and 14. Manifold 70 receives coolant from conduit 63 and manifold 62.

In some instances the mill cavity may be operated in a flooded condition with the lower rolls below work roll 14 immersed in water. Under such operating conditions, spray nozzles 74 (FIG. 1) may be provided in the upper portion of the mill cavity to spray coolant over the upper intermediate rolls and casters and provide cooling thereof.

In any lubrication arrangement, the only lubricant actually serving a lubricating purpose is the thin film that separates the bearing surfaces. Any additional or surplus lubricant serves no useful purpose, and may even be detrimental. In the present case, any excess oil from the back-up bearing assemblies would mix with the coolant and decrease the cooling properties thereof, thus decreasing the allowable operating speed of the mill.

In accordance with the invention, the bearings of the casters are lubricated with an oil fog or mist. To supply only a sufficient amount of lubricant to bearing assemblies 43 to properly lubricate the bearings without over-lubricating the bearings, an oil mist is supplied to manifold 61 from an oil fog unit 75. As used herein the phrases "oil mist" or "fog" refer to a suspension of finely divided oil particles in air.

Fog unit 75 is of the type comprising a venturi section and an oil reservoir. Air passing through the venturi section creates a pressure differential that causes oil to flow from the reservoir into the venturi section. An oil mist is created in the venturi and is discharged into the oil reservoir above the liquid oil. Only the finer particles of oil, two microns or less, remain airborne and are conveyed through conduit 76 to manifold 61. A suitable oil fog unit 75 is a Norgren Model 33AF–16 of the C. A. Norgren Company, Englewood, Colorado, which includes an air line filter and pressure regulator upstream of an air compressor 77 which supplies air under pressure to the fog unit 75 and forces the generated oil mist or fog through conduit 76 to manifold 61. The compressor 77 produces a pressure head in the generated mist causing it to follow the path hereinafter described.

The oil mist or fog from the fog unit 75 travels through conduit 76 to manifold 61 where it enters conduits 47 in shafts 42 and travels into passageways 50 to annular recesses 48. In accordance with the invention, a reclassifier 78 (FIG. 3) defining a sharp-edged orifice 79 of substantially reduced diameter therethrough is provided in each of passageways 50. The reclassifiers 78 act to recombine the small oil particles of the oil fog into larger oil particles which are blown through apertures 49 in inner races 44 into bearing assemblies 43. The reclassifiers 78 provide a surface 79a upon which the oil mist impinges and the particles thereof combine into drops of oil which are then conveyed through orifice 79 by the differential in the pressure in passageways 50 and the pressure within orifices 79. There is a sharp increase in velocity of the air in entering the orifice 79 with a resultant drop in pressure. The air, after separation of the oil therefrom is vented into the mill cavity 11a through the openings defined by the inner and outer races 44 and 45.

As the recombined particles of oil are blown onto the outer races through apertures 49 they continuously cover the bearing surfaces with a protective film of clean oil. The oil particles are efficiently used to lubricate the bearing assemblies 43 by supplying the correct amount of oil required with essentially no overflow from the bearing assemblies. Any small amount of oil which escapes from the bearing assemblies is allowed to flow through the annular recesses 51 of disks 41 and radial slots 53 as indicated by the arrows (FIG. 3). The small amount of oil which exits from the bearing assemblies does not harmfully dilute or enrich the coolant in the mill cavity. In fact, if the coolant is a water-oil emulsion, any oil exiting from the bearing assemblies 43 acts to replenish the oil in the emulsion which is consumed in lubricating the roll bite.

In this manner the lubricating oil for the back-up bearings 43 is metered to the bearings in the proper amount required for lubrication thereof and reduces or substantially eliminates any waste of oil. Moreover, no substantial amount of back-up bearing lubricating oil escapes into the coolant, which would decrease the cooling capabilities of the coolant and hence require a decrease in the operating speed of the mill.

For exemplary purposes only, the invention has been practiced in a rolling mill of the type described wherein the shafts 42 measured 4" in diameter, the passageways 50 measured .375" and the orifice 79 was .093" in diameter. In such an arrangement a preferred lubricating oil is a 1000/2000 SUS at 100° F. mineral oil and the coolant is water or a water-oil emulsion. In one installation embodying the invention and using the aforementioned Norgren Model 33AF–16 fog and control unit, the oil consumption for a mill of the type described is only one quart in an eight hour mill operating period. The mist or fog is supplied to the manifold at the rate of twenty cubic feet per minute.

The oil mist or fog is supplied to the bearing assemblies at a chosen rate in accordance with the bearing surface area which minimizes or substantially eliminates waste of oil and deleterious mixing of the bearing lubricating oil with the coolant. Moreover inspection and maintenance of the bearing assemblies is greatly reduced.

While the invention has been disclosed in mills having intermediate rolls between the work rolls and casters, it is to be understood that it is also applicable to mills wherein each work roll is backed up directly by a pair of casters.

A preferred embodiment of the invention has been illustrated and described for purposes of disclosure, however, modifications to the disclosed embodiment as well as other embodiments thereof may occur to those skilled in the art which do not depart from the spirit and scope of the invention. Accordingly, the appended claims are intended to cover all modifications and embodiments of the invention which do not depart from the spirit and scope of the invention.

What is claimed is:

1. In a rolling mill having a mill housing defining a cavity therein, work rolls, the work rolls being backed by casters which in turn are backed by the housing, each of the casters including a shaft having a plurality of antifriction bearing assemblies thereon having inner races mounted on the shaft and outer races rotatively backing up the work rolls, means for introducing a coolant onto strip passed through the work rolls and means for collecting and recirculating the coolant, the improvement comprising: means for supplying and metering lubricant to the bearing assemblies, said means including a conduit defined in each shaft, means for forcing an air-oil mist into the conduit, passages defined in the shafts for providing communication between the conduits and the bearing assemblies, means in said passages for separating and recombining oil particles in the mist to cause oil to enter the bearing assemblies in liquid form, and means for allowing oil to exit from the bearing assemblies into the mill cavity to combine with the coolant.

2. In a rolling mill having a mill housing, defining a cavity therein, work rolls, the work rolls being backed by casters which in turn are backed by the housing, each of the casters including a shaft having a plurality of antifriction bearing assemblies thereon having inner races mounted on the shaft and outer races rotatively backing up the work rolls, means for introducing a coolant onto strip passed through the work rolls and means for collecting and recirculating the coolant, the improvement comprising: means for continuously supplying and metering lubricant to the bearing assemblies, said means including a conduit defined in each shaft, means for generating an air-oil mist and forcing the air-oil mist into the conduit, passages defined in the shafts for providing communication between the conduits and the bearing assemblies, means in said passages for separating and recombining oil particles in the mist to cause oil to enter the bearing assemblies in liquid form, and means for allowing oil to exit from the bearing assemblies into the mill cavity to combine with the coolant.

3. In a rolling mill, having a mill housing, work rolls, the work rolls being backed by casters, which in turn are backed by the housing, each of the casters including a shaft having a plurality of antifriction bearing assemblies thereon having inner races mounted on the shaft and outer races rotatively engaging the intermediate rolls, means for directing a coolant onto strip being rolled by the mill and means for collecting and recirculating the coolant, the improvement comprising: a conduit defined axially in the shafts, an annular recess defined in the shafts adjacent the inner race of each bearing assembly, apertures defined in each inner race providing communication between the bearing assemblies and a recess, passageways defined in the shaft providing communication between the conduit and the annular recesses, means for generating an air-oil mist, means for conveying the mist into the conduits and means in each of the passageways for recombining the oil particles in the mist and directing the recombined oil into the bearing assemblies, and means for combining the recombined oil with the coolant.

4. In a rolling mill having a mill housing, defining a cavity therein, work rolls, the work rolls being backed by casters in turn backed by the housing, each of the casters including a shaft having a plurality of antifriction bearing assemblies thereon having inner races mounted on the shaft and outer races rotatively backing up the work rolls, means for directing a coolant onto strip being rolled by the mill and means for collecting and recirculating the coolant, the improvement comprising: disks supporting each of the shafts, the bearing assemblies being mounted on the shafts alternately with the disks, the disks having annular recesses in the sides thereof at the peripheries thereof communicating with the area defined between the races of the bearing assemblies, said recesses providing communication between the areas defined between the races and the mill cavity whereby oil may exit from the bearing assemblies into the mill cavity and combine with the coolant, a conduit defined axially in the shafts, an annular recess defined in the shafts adjacent the inner race of each bearing assembly, apertures defined in each inner race providing communication between the bearing assemblies and a recess, passageways defined in the shaft providing communication between the conduit and the annular recesses, means for generating an air-oil mist, means for conveying the mist into the conduits, and means in each of the passageways for recombining the oil particles in the mist and directing the recombined oil into the bearing assemblies.

5. In a rolling mill having a mill housing, defining a cavity therein, work rolls, the work rolls being backed by casters in turn backed by the housing, each of the casters comprising a shaft having a plurality of antifriction bearing assemblies thereon having inner races mounted on the shaft, and outer races rotatively backing up the work rolls, means for directing a coolant onto strip being rolled by the mill and means for collecting and recirculating the coolant, the improvement comprising: collars mounted in a saddle element, disks mounted in the collars supporting each of the shafts, the bearing assemblies being mounted on the shafts alternately with the disks, the disks being of greater thickness than the collars and having annular recesses in the sides thereof at the peripheries thereof communicating with the area defined between the races of the bearing assemblies, thrust washers disposed on opposite sides of the collars about the disks, said thrust washers having radial slots therein providing communication between said recesses and the mill cavity, whereby oil may exit from the bearing assemblies into the mill cavity, a conduit defined axially in the shafts, an annular recess defined in the shafts adjacent the inner race of each bearing assembly, apertures defined in each inner race providing communication between the bearing assemblies and a recess, passageways defined in the shaft providing communication between the conduit and the annular recesses, means for generating an air-oil mist, means for conveying the mist into the conduits, means in each of the passageways for recombining the oil particles in the mist and directing the recombined oil into the bearing assemblies.

6. In a strip mill having bearings and a plurality of rolls for processing strip material, means for lubricating the bearings with a lubricating fluid, a source of coolant fluid, means for combining the unused lubricant from the bearings with the coolant fluid, and means for circulating the combined coolant fluid and lubricating fluid to cool said strip, the strip carrying off sufficient amounts of lubricating fluid to prevent appreciable contamination of the coolant fluid.

7. In a strip mill having bearings therein and a plurality of rolls for processing strip material, means for generating an air-oil mist, means for delivering said mist to the vicinity of the bearings, means for condensing the oil in said mist and providing the oil to the bearings, a source of coolant fluid, means for combining unused oil from said bearings with the coolant fluid, and means for circulating said combined coolant fluid and said oil to cool the strip material being processed by the rolls, the strip carrying off sufficient oil to prevent appreciable contamination of said coolant fluid.

8. In a strip mill having bearings therein and a plurality of rolls for processing strip material, means for generating an air-oil mist, means for delivering said mist to the vicinity of the bearings, means for condensing the oil in said mist and providing the oil to the bearings, a source of coolant fluid, means for providing coolant fluid to said strip, means for combining the unused oil in said bearings with the coolant fluid not carried off by the strip, and means for returning the combined oil and coolant fluid to the source of said coolant fluid so that the combined fluid will thereafter be used as the coolant fluid.

9. A method for cooling strip material being processed in a plurality of rolls and lubricating the roll bearings of the rolls comprising the steps of generating an air-oil mist and providing the oil to lubricate the bearings, introducing coolant fluid to the strip material, mixing the unconsumed oil from the bearings with that portion of the coolant fluid not carried off by the strip material, and using the resultant mixture of coolant and oil to cool the strip material, the strip material carrying off sufficient amounts of oil from the resultant mixture to prevent appreciable contamination of the coolant fluid.

10. A method for cooling strip material being processed in a plurality of rolls and lubricating the roll bearings of the rolls, comprising the steps of providing an air-oil mist to lubricate the bearings, mixing any unused oil from the bearings with a coolant fluid, introducing the mixed oil and coolant fluid to the strip material being processed to cool the strip material, the strip material carrying off appreciable amounts of the oil so that the coolant fluid is not significantly contaminated and can be reused to continuously cool the strip.

References Cited by the Examiner
UNITED STATES PATENTS

| | | | |
|---|---|---|---|
| 2,776,586 | 1/57 | Sendzimir | 80—38 |
| 2,867,481 | 1/59 | Hornbostel | 184—7 |
| 3,052,318 | 9/62 | Thomas | 184—7 |

WILLIAM J. STEPHENSON, *Primary Examiner.*